(12) United States Patent
Kraft

(10) Patent No.: US 11,280,508 B1
(45) Date of Patent: Mar. 22, 2022

(54) SYSTEMS AND METHODS FOR DETECTING INACCURATE AIRFLOW DELIVERY IN A CLIMATE CONTROL SYSTEM

(71) Applicant: Trane International Inc., Davidson, NC (US)

(72) Inventor: Wayne N. Kraft, Tyler, TX (US)

(73) Assignee: Trane International, Inc., Davidson, NC (US)

( * ) Notice: Subject to any disclaimer, the term of this patent is extended or adjusted under 35 U.S.C. 154(b) by 336 days.

(21) Appl. No.: 16/654,956

(22) Filed: Oct. 16, 2019

(51) Int. Cl.
| | |
|---|---|
| F24F 11/38 | (2018.01) |
| F24F 11/49 | (2018.01) |
| F24F 11/56 | (2018.01) |
| F24F 11/64 | (2018.01) |
| F24F 11/67 | (2018.01) |
| F24F 11/74 | (2018.01) |
| F24F 11/77 | (2018.01) |
| F24F 11/89 | (2018.01) |
| F24F 3/16 | (2021.01) |

(Continued)

(52) U.S. Cl.
CPC ............ *F24F 11/38* (2018.01); *F24F 8/10* (2021.01); *F24F 11/49* (2018.01); *F24F 11/56* (2018.01); *F24F 11/64* (2018.01); *F24F 11/67* (2018.01); *F24F 11/74* (2018.01); *F24F 11/77* (2018.01); *F24F 11/89* (2018.01); *G05B 15/02* (2013.01)

(58) Field of Classification Search
CPC .... F24F 11/38; F24F 8/10; F24F 11/49; F24F 11/56; F24F 11/64; F24F 11/67; F24F 11/74; F24F 11/77; F24F 11/89; G05B 15/02
See application file for complete search history.

(56) References Cited

U.S. PATENT DOCUMENTS

| | | |
|---|---|---|
| 5,492,273 A | 2/1996 | Shah |
| 5,705,734 A | 1/1998 | Ahmed |
| 6,223,544 B1 | 5/2001 | Seem |

(Continued)

FOREIGN PATENT DOCUMENTS

WO    2018226973 A1    12/2018

OTHER PUBLICATIONS

Kraft, Wayne N.; U.S. Appl. No. 16/714,199, filed Dec. 13, 2019; Title: Systems and Methods for Estimating an Input Power Supplied to a Fan Motor of a Climate Control System; 48 pages.

*Primary Examiner* — Ramesh B Patel
(74) *Attorney, Agent, or Firm* — Womble Bond Dickinson (US) LLP

(57) ABSTRACT

Methods and related systems for detecting inaccurate airflow delivery of an indoor unit of a climate control system are disclosed. In an embodiment, the method includes operating a fan of the climate control system by transmitting a requested airflow value from a controller of the climate control system to a controller of the fan. Additionally, the method includes collecting estimated airflow values of the indoor fan, and identifying a steady state condition of the climate control system. Further, the method includes determining airflow error values, and issuing at least one of a first alert to a user of the climate control system in response to at least one of the airflow error values being equal to or greater than an alert value, and a second alert to the user in response to each of the airflow error values being less than the alert value.

20 Claims, 5 Drawing Sheets

(51) Int. Cl.
*G05B 15/02* (2006.01)
*F24F 8/10* (2021.01)

(56) References Cited

U.S. PATENT DOCUMENTS

| | | | |
|---|---|---|---|
| 6,994,620 B2 * | 2/2006 | Mills | F24F 11/30 |
| | | | 454/255 |
| 7,444,251 B2 | 10/2008 | Nikovski et al. | |
| 9,732,976 B2 | 8/2017 | Wang et al. | |
| 10,145,576 B2 | 12/2018 | Boufounos et al. | |
| 10,254,318 B2 | 4/2019 | Shahi et al. | |
| 10,852,044 B1 * | 12/2020 | Elliott | F25B 49/025 |
| 2005/0278071 A1 * | 12/2005 | Durham | G05D 23/1932 |
| | | | 700/276 |
| 2010/0060215 A1 * | 3/2010 | Woodward | H02P 25/18 |
| | | | 318/400.09 |
| 2010/0101265 A1 * | 4/2010 | Yokouchi | H02P 27/08 |
| | | | 62/426 |
| 2010/0204945 A1 | 8/2010 | Shahi et al. | |
| 2011/0181216 A1 * | 7/2011 | Bass | H02P 6/28 |
| | | | 318/400.11 |
| 2012/0072029 A1 | 3/2012 | Persaud et al. | |
| 2013/0345995 A1 | 12/2013 | Shah et al. | |
| 2014/0244051 A1 * | 8/2014 | Rollins | F04D 27/004 |
| | | | 700/282 |
| 2014/0371918 A1 * | 12/2014 | Douglas | G05D 7/0676 |
| | | | 700/276 |
| 2015/0233380 A1 * | 8/2015 | Sasaki | F04D 27/004 |
| | | | 417/44.1 |
| 2017/0234561 A1 | 8/2017 | Lin et al. | |
| 2018/0088547 A1 | 3/2018 | Perez | |
| 2019/0280630 A1 * | 9/2019 | Kraft | H02P 6/06 |
| 2019/0310670 A1 * | 10/2019 | Pillai | H05B 47/175 |
| 2020/0240672 A1 * | 7/2020 | Patil | F24F 11/81 |

* cited by examiner

SYSTEMS AND METHODS FOR DETECTING INACCURATE AIRFLOW DELIVERY IN A CLIMATE CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Climate control systems, such as heating, ventilation, and/or air conditioning (HVAC) systems may generally be used in residential and/or commercial areas for heating and/or cooling to create comfortable temperatures inside those areas. Some climate control systems may be split-type heat pump systems. These systems typically have an indoor air handling unit and an outdoor unit, which are capable of cooling a comfort zone by operating in a cooling mode for transferring heat from a comfort zone to an ambient zone using a refrigeration cycle. These systems are also generally capable of reversing the direction of refrigerant flow through the components of the climate control system so that heat is transferred from the ambient zone to the comfort zone, thereby heating the comfort zone.

During operation, a command may be communicated to a fan controller of an indoor fan of the climate control system by a system controller requesting the indoor fan to provide a requested airflow in order to satisfy a request for cooling (when operating in the cooling mode of the climate control system) or a request for heating (when operating in a heating mode of the climate control system) as determined by the system controller. However, the actual airflow delivered by the indoor fan of the climate control system may deviate substantially from the requested airflow, hindering the climate control system from timely satisfying the request for cooling or heating.

BRIEF SUMMARY

Some embodiments disclosed herein are directed to a method for detecting inaccurate airflow delivery of an indoor unit of a climate control system. In an embodiment, the method includes operating an indoor fan of the climate control system to produce an airflow through an indoor space by transmitting a requested airflow value from a system controller of the climate control system to a fan controller of the indoor fan. In addition, the method includes collecting a plurality of estimated airflow values of the indoor fan estimated by the system controller during the operation of the indoor fan, and identifying a steady state condition of the climate control system from the plurality of estimated airflow values. Further, the method includes determining a plurality of airflow error values from the requested airflow value and the plurality of estimated airflow values collected during the steady state condition, and issuing at least one of a first alert to a user of the climate control system in response to at least one of the plurality of airflow error values being equal to or greater than an alert value, and a second alert to the user in response to each of the plurality of airflow error values being less than the alert value.

Other embodiments disclosed herein are directed to a climate control system for an indoor space. In an embodiment, the climate control system includes an indoor fan configured to produce an airflow through the indoor space. In addition, the climate control system includes a controller to be coupled to the indoor fan. The controller is configured to operate the indoor fan of the climate control system to produce the airflow through the indoor space by transmitting a requested airflow value to a fan controller of the indoor fan, and collect a plurality of estimated airflow values of the indoor fan estimated by the controller. In addition, the controller is configured to identify a steady state condition of the climate control system from the plurality of estimated airflow values, and determine a plurality of airflow error values from the requested airflow value and the plurality of estimated airflow values collected during the steady state condition. Further, the controller is configured to issue at least one of a first alert to a user of the climate control system in response to at least one of the plurality of airflow error values being equal to or greater than an alert value, and a second alert to the user in response to each of the plurality of airflow error values being less than the alert value.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
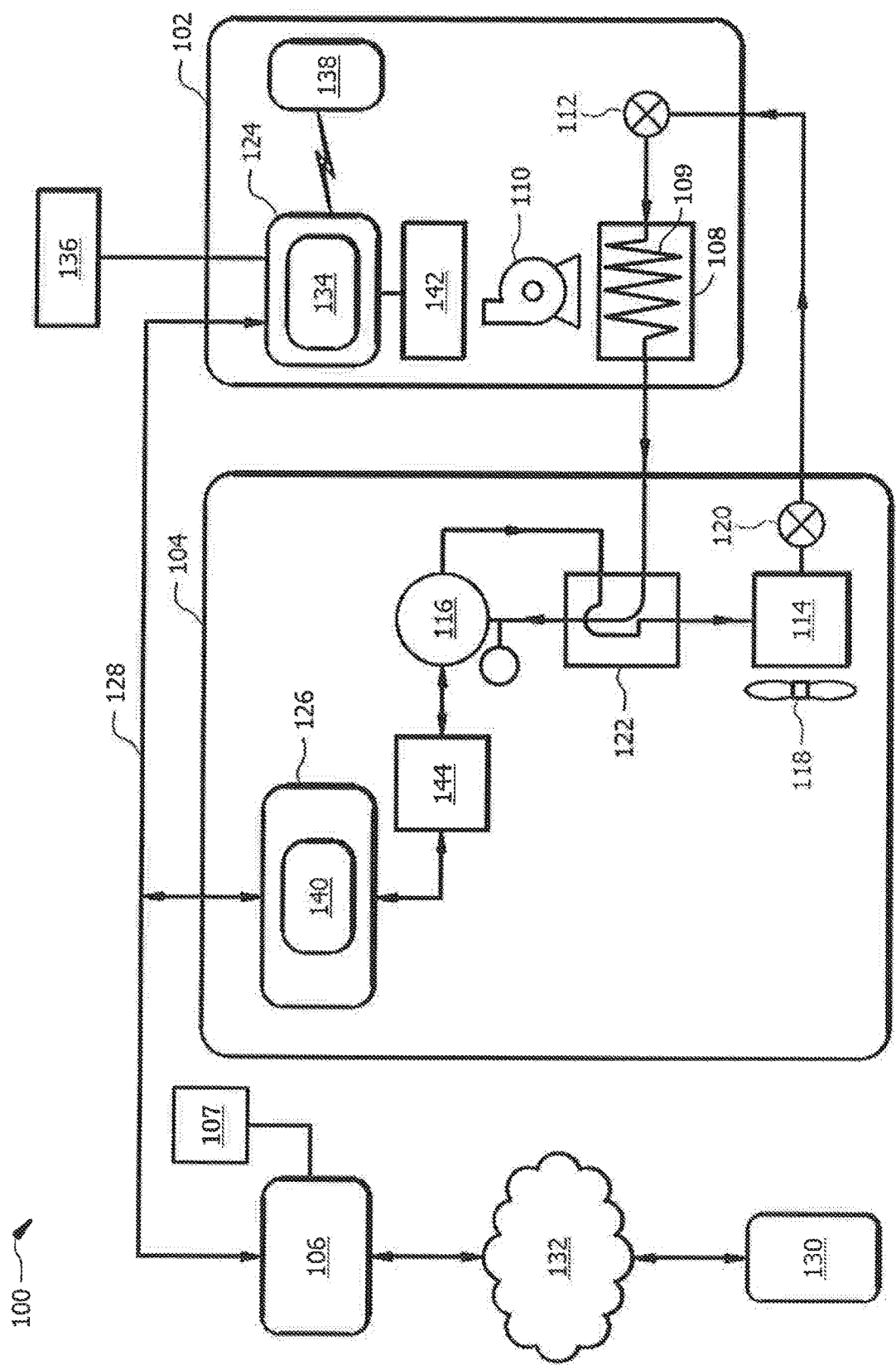
FIG. 1 is a diagram of a HVAC system configured for operating in a cooling mode according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

During the operation of a climate control system an airflow request or requested airflow may be communicated to an indoor fan of an indoor unit of the climate control system by a system controller to satisfy a request for cooling (when the climate control system is in a cooling mode) or a request for heating (when the climate control system is in a heating mode) as determined by the system controller. Additionally, the actual airflow delivered by the indoor unit may deviate substantially from the requested airflow communicated by the system controller, inhibiting the climate control system from timely satisfying the request for cooling or heating.

The system controller of the climate control system may compare the requested airflow to the actual airflow delivered by the indoor unit to evaluate the accuracy of the airflow delivery of the climate control system. For example, the accuracy of the airflow delivery of the climate control system may be evaluated during a commissioning process of the climate control system (e.g., following an installation of the climate control system) in order to ensure the climate control system performs in accordance with all pertinent regulatory standards. In some conventional climate control systems, a third party vendor utilizing specialized testing or commissioning equipment may be relied upon for verifying the accuracy of the airflow delivery of the climate control system as part of the commissioning process of the climate control system, thereby increasing the time and cost required for performing the commissioning of the system. The accuracy of the airflow delivery of the climate control system may also be evaluated continually over the operating life of the climate control system to ensure that the climate control system may timely satisfy requests for cooling and heating of an indoor space as required by a homeowner or other user of the climate control system.

However, various challenges are presented with determining the accuracy of the airflow delivery of a climate control system by comparing the requested airflow with the actual delivered airflow. Particularly, transient behavior of the climate control system may introduce a substantial amount of noise or error into the determination of the accuracy of airflow delivery. Such transient behavior may include changes in the requested airflow requested by the system controller made in response to changing thermal loads applied to the indoor space cooled and heated by the climate control system and/or inputs to the system controller from a user of the climate control system (e.g., changes to a set point of the climate control system by the homeowner, etc.).

Moreover, it is expected for the requested airflow to diverge from the actual airflow following an increase in requested airflow given that the indoor fan of the climate control system requires a period of time to increase from idle to a fan speed sufficient to provide an actual airflow equal to the requested airflow. Changes in requested airflow transient behavior may also result from physical changes in the indoor space such as the opening or closing of zone dampers of the indoor space. Additionally, spurious data pertaining to issues with data quality (e.g., interactions between different software of the climate control system, communication bus refreshing, etc.), and repeated values resulting from e.g., lack of synchronization between different sources of data, may also introduce noise or error into the determination of the accuracy of airflow delivery.

Accordingly, embodiments disclosed herein include systems and methods for determining the accuracy of airflow delivery of a climate control system that includes collecting a plurality of estimated airflow data or values of an indoor fan of a climate control system, identifying a steady state of the climate control system from a requested airflow value and the collected plurality of estimated airflow values, and determining a plurality of raw airflow error values between the requested airflow value and the plurality of estimated airflow values collected during the identified steady state condition. Additionally, embodiments disclosed herein include determining a plurality of filtered airflow error values by filtering the plurality of raw airflow error values whereby the amount of noise, including spurious and repeated data, in the plurality of raw airflow error values is reduced, and determining a plurality of smoothed airflow error values by smoothing the plurality of filtered airflow error values whereby remaining noise in the plurality of filtered airflow error values is further mitigated. As will be described in more detail below, use of the embodiments disclosed herein may allow a climate control system to accurately and timely generate an alert to a user of the climate control system to service the climate control system such that inaccurate airflow delivery provided by the indoor fan of the climate control system may be addressed.

Referring now to FIG. 1, a schematic diagram of a climate control system 100 according to some embodiments is shown. In this embodiment, climate control system 100 is a HVAC system, and thus, system 100 may be referred to herein as HVAC system 100. In the illustrated embodiment, HVAC system 100 comprises a heat pump system that may be selectively operated to implement one or more substantially closed thermodynamic refrigeration cycles to provide a cooling functionality (hereinafter "cooling mode"), a heating functionality (hereinafter "heating mode"), and/or an air circulation functionality (hereinafter "fan-only mode"). In other embodiments, the HVAC system is an air conditioner that may only provide cooling through use of the refrigeration cycle. The HVAC system 100, configured as a heat pump system, may comprise an indoor unit 102, an outdoor unit 104, and a system controller 106 that may generally control operation of the indoor unit 102 and/or the outdoor unit 104. In some embodiments, HVAC system 100 may instead comprise a ductless HVAC system.

Indoor unit 102 generally includes an indoor heat exchanger 108, an indoor fan 110, an indoor metering device 112, and an indoor controller 124. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. Specifically, indoor heat exchanger 108 may include a coil 109 for channeling the refrigerant therethrough that segregates the refrigerant from any air flowing through indoor heat exchanger 108 during operations. In some embodiments, the indoor heat exchanger 108 may comprise a plate-fin heat exchanger. However, in other embodiments, indoor heat exchanger 108 may comprise a microchannel heat exchanger and/or any other suitable type of heat exchanger.

The indoor fan 110 may generally comprise a centrifugal blower comprising a blower housing, a blower impeller at least partially disposed within the blower housing, and a blower motor configured to selectively rotate the blower impeller. The indoor fan 110 may generally be configured to provide airflow through the indoor unit 102 and/or the indoor heat exchanger 108 (specifically across or over the coil 109) to promote heat transfer between the airflow and a refrigerant flowing through the coil 109 of the indoor heat exchanger 108. The indoor fan 110 may also be configured to deliver temperature-conditioned air from the indoor unit 102 to one or more areas and/or zones of an indoor space. The indoor fan 110 may generally comprise a mixed-flow fan and/or any other suitable type of fan. The indoor fan 110 may generally be configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. The indoor metering device 112 may generally comprise an electronically-controlled motor-driven electronic expansion valve (EEV). In some embodiments, however, the indoor metering device 112 may comprise a thermostatic expansion valve, a capillary tube assembly, and/or any other suitable metering device. In some embodiments, while the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

Outdoor unit 104 generally comprises an outdoor heat exchanger 114, a compressor 116, an outdoor fan 118, an outdoor metering device 120, a reversing valve 122, and an outdoor controller 126. In some embodiments, the outdoor unit 104 may also comprise a plurality of temperature sensors for measuring the temperature of the outdoor heat exchanger 114, the compressor 116, and/or the outdoor ambient temperature. The outdoor heat exchanger 114 may generally be configured to promote heat transfer between a refrigerant carried within internal passages of the outdoor heat exchanger 114 and an airflow that contacts the outdoor heat exchanger 114 but that is segregated from the refrigerant. In some embodiments, outdoor heat exchanger 114 may comprise a plate-fin heat exchanger. However, in other embodiments, outdoor heat exchanger 114 may comprise a spine-fin heat exchanger, a microchannel heat exchanger, or any other suitable type of heat exchanger. While not specifically shown, it should be appreciated that outdoor heat exchanger 114 may include a coil similar to coil 109 previously described above for indoor heat exchanger 108.

The compressor 116 may generally comprise a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiments, the compressor 116 may comprise a rotary type compressor configured to selectively pump refrigerant at a plurality of mass flow rates. In some embodiments, however, the compressor 116 may comprise a modulating compressor that is capable of operation over a plurality of speed ranges, a reciprocating-type compressor, a single speed compressor, and/or any other suitable refrigerant compressor and/or refrigerant pump. In some embodiments, the compressor 116 may be controlled by a compressor drive controller 144, also referred to as a compressor drive and/or a compressor drive system.

The outdoor fan 118 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the outdoor heat exchanger 114. The outdoor fan 118 may generally be configured as a modulating and/or variable speed fan capable of being operated at a plurality of speeds over a plurality of speed ranges. In other embodiments, the outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. In yet other embodiments, the outdoor fan 118 may be a single speed fan. Further, in other embodiments, the outdoor fan 118 may comprise a mixed-flow fan, a centrifugal blower, and/or any other suitable type of fan and/or blower.

The outdoor metering device 120 may generally comprise a thermostatic expansion valve. In some embodiments, however, the outdoor metering device 120 may comprise an electronically-controlled motor driven EEV similar to indoor metering device 112, a capillary tube assembly, and/or any other suitable metering device. In some embodiments, while the outdoor metering device 120 may be configured to meter the volume and/or flow rate of refrigerant through the outdoor metering device 120, the outdoor metering device 120 may also comprise and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally comprise a four-way reversing valve. The reversing valve 122 may also comprise an electrical solenoid, relay, and/or other device configured to selectively move a component of the reversing valve 122 between operational positions to alter the flow path of refrigerant through the reversing valve 122 and consequently the HVAC system 100. Additionally, the reversing valve 122 may also be selectively controlled by the system controller 106 and/or an outdoor controller 126.

The system controller 106 may generally be configured to communicate with an indoor controller 124 of the indoor unit 102, an outdoor controller 126 of the outdoor unit 104, and/or other components of the HVAC system 100. In some embodiments, the system controller 106 may be configured to control operation of the indoor unit 102 and/or the outdoor unit 104. In some embodiments, the system controller 106 may be configured to monitor and/or communicate, directly or indirectly, with a plurality of sensors associated with components of the indoor unit 102, the outdoor unit 104, etc. The sensors may measure or detect a variety of parameters, such as, for example, pressure, temperature, and flow rate of the refrigerant as well as pressure and temperature of other components or fluids of or associated with HVAC system 100. In some embodiments, the HVAC system 100 may include a sensor (or plurality of sensors) for sensing or detecting the ambient outdoor temperature. Additionally, in some embodiments, the system controller 106 may comprise a temperature sensor and/or may further be configured to control heating and/or cooling of zones associated with the HVAC system 100 (e.g., within the indoor space). In some embodiments, the system controller 106 may be configured as a thermostat, having a temperature sensor and a user interface, for controlling the supply of conditioned air to zones associated within the HVAC system 100.

The system controller 106 may be in communication with a remote input/output (I/O) unit 107 (e.g., a graphical user interface, a touchscreen interface, or the like) for displaying information and for receiving user inputs. The I/O unit 107 may display information related to the operation of the HVAC system 100 (e.g., from system controller 106) and may receive user inputs related to operation of the HVAC system 100. During operations, the I/O unit 107 may communicate received user inputs to the system controller 106, which may then execute control of HVAC system 100 accordingly. Communication between the I/O unit 107 and system controller 106 may be wired, wireless, or a combination thereof. In some embodiments, the I/O unit 107 may further be operable to display information and receive user inputs tangentially and/or unrelated to operation of the HVAC system 100. In some embodiments, however, the I/O unit 107 may not comprise a display and may derive all information from inputs from remote sensors and remote configuration tools (e.g., remote computers, servers, smartphones, tablets, etc.). In some embodiments, system controller 106 may receive user inputs from remote configuration tools, and may further communicate information relating to HVAC system 100 to I/O unit 107. In these embodiments, system controller 106 may or may not also receive user inputs via I/O unit 107.

In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or any other device 130 via a communication network 132. In some embodiments, the communication network 132 may comprise a telephone network, and the other device 130 may comprise a telephone. In some embodiments, the communication network 132 may comprise the Internet, and the other device 130 may comprise a smartphone and/or other Internet-enabled mobile telecommunication device. In other embodiments, the communication network 132 may also comprise a remote server.

The indoor controller 124 may be carried by the indoor unit 102 and may generally be configured to receive information inputs, transmit information outputs, and/or otherwise communicate with the system controller 106, the outdoor controller 126, and/or any other device 130 via the communication bus 128 and/or any other suitable medium of communication. In some embodiments, the indoor controller 124 may be configured to communicate with an indoor personality module 134 that may comprise information related to the identification and/or operation of the indoor unit 102. In some embodiments, the indoor controller 124 may be configured to receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

The indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may also be configured to communicate with the outdoor metering device 120 and/or otherwise affect control over the outdoor metering device 120.

The outdoor controller 126 may be carried by the outdoor unit 104 and may be configured to receive information inputs, transmit information outputs, and/or otherwise communicate with the system controller 106, the indoor controller 124, and/or any other device 130 via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with and/or control a compressor drive controller 144 that is configured to electrically power and/or control the compressor 116.

System controller 106, indoor controller 124, outdoor controller 126, compressor drive controller 144, indoor fan controller 142, and indoor EEV controller 138 may each comprise any suitable device or assembly which is capable of receiving electrical (or other data) signals and transmitting electrical (or other data) signals to other devices. In particular, while not specifically shown, controllers 106, 124, 126, 138, 142, and 144 may each include a processor and a memory. The processors (e.g., microprocessor, central processing unit, or collection of such processor devices, etc.) may execute machine readable instructions (e.g., non-transitory machine readable medium) provided on the corresponding memory to provide the processor with all of the functionality described herein. The memory of each controller 106, 124, 126, 138, 142, and 144 may comprise volatile storage (e.g., random access memory), non-volatile storage (e.g., flash storage, read only memory, etc.), or combinations of both volatile and non-volatile storage. Data consumed or produced by the machine readable instructions can also be stored on the memory of controllers 106, 124, 126, 138, 142, and 144.

During operation, system controller 106 may generally control the operation of HVAC system 100 through the indoor controller 124, outdoor controller 126, compressor drive controller 144, indoor fan controller 142, and indoor EEV controller 138 (e.g., via communication bus 128). In the description below, specific control methods are described (e.g., methods 300, 370). It should be understood that the features of these described methods may be performed (e.g., wholly or partially) by system controller 106, and/or by one or more of controllers 124, 126, 144, 142, 138 as directed by system controller 106. As a result, the controller or controllers of HVAC system 100 (e.g., controllers 106, 124, 126, 142, 144, 138, etc.) may include and execute machine-readable instructions (e.g., non-volatile machine readable instructions) for performing the operations and methods described in more detail below. In some embodiments, each of the controllers 106, 124, 126, 138, 142, and 144 may be embodied in a singular control unit, or may be dispersed throughout the individual controllers 106, 124, 126, 138, 142, and 144 as described above.

As shown in FIG. 1, the HVAC system 100 is configured for operating in a so-called cooling mode in which heat may generally be absorbed by refrigerant at the indoor heat exchanger 108 and rejected from the refrigerant at the outdoor heat exchanger 114. Starting at the compressor 116, the compressor 116 may be operated to compress refrigerant and pump the relatively high temperature and high pressure compressed refrigerant through the reversing valve 122 and to the outdoor heat exchanger 114, where the refrigerant may transfer heat to an airflow that is passed through and/or into contact with the outdoor heat exchanger 114 by the outdoor fan 118. After exiting the outdoor heat exchanger 114, the refrigerant may flow through and/or bypass the outdoor metering device 120, such that refrigerant flow is not substantially restricted by the outdoor metering device 120. Refrigerant generally exits the outdoor metering device 120 and flows to the indoor metering device 112, which may meter the flow of refrigerant through the indoor metering device 112, such that the refrigerant downstream of the indoor metering device 112 is at a lower pressure than the refrigerant upstream of the indoor metering device 112. From the indoor metering device 112, the refrigerant may enter the indoor heat exchanger 108. As the refrigerant is passed through coil 109 of the indoor heat exchanger 108, heat may be transferred to the refrigerant from an airflow that is passed through and/or into contact with the indoor heat exchanger 108 by the indoor fan 110. Refrigerant leaving the indoor heat exchanger 108 may flow to the reversing valve 122, where the reversing valve 122 may be selectively configured to divert the refrigerant back to the compressor 116, where the refrigeration cycle may begin again.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may re-enter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
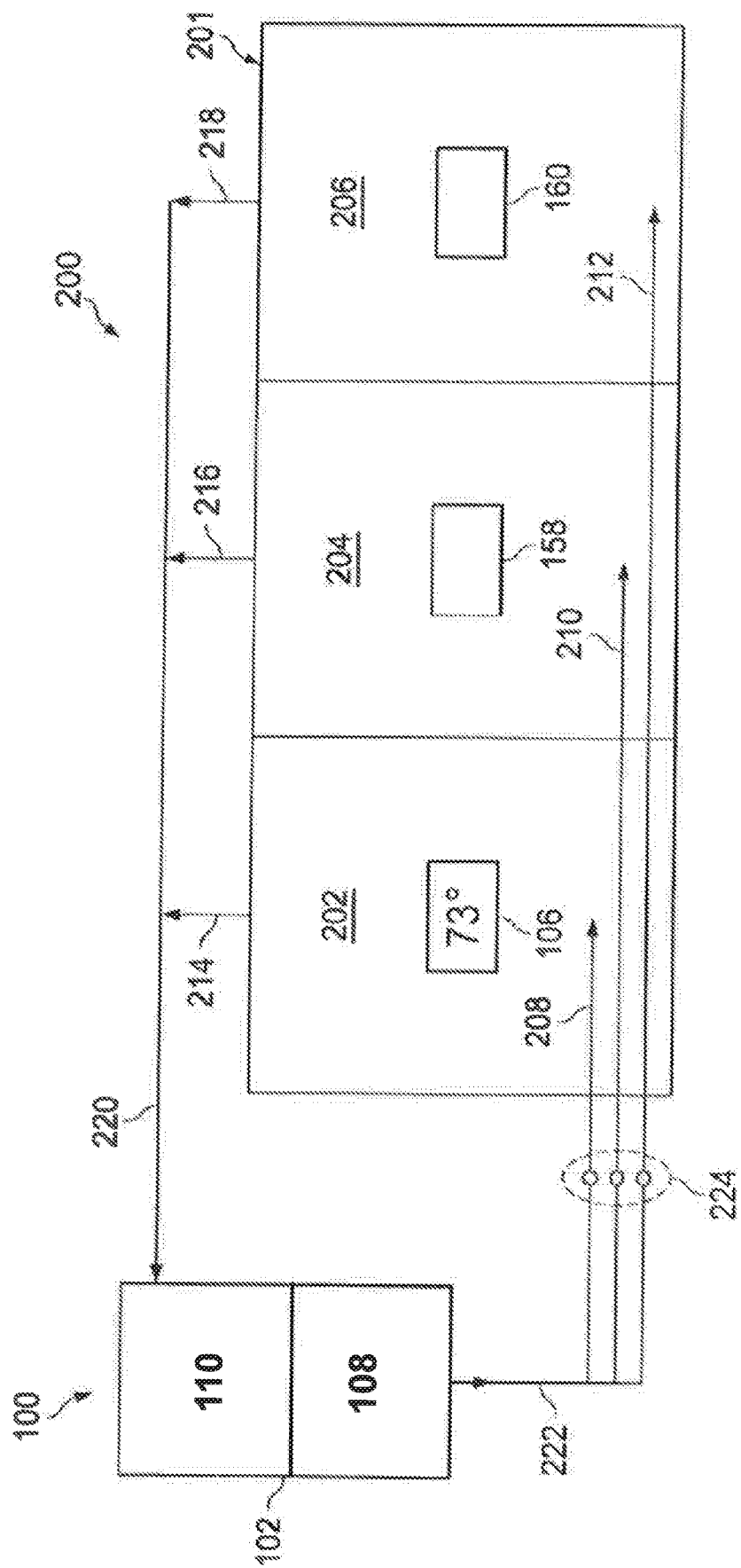
FIG. 2 is a schematic diagram of an air circulation path of the HVAC system of FIG. 1 according to an embodiment of the disclosure.

Referring now to FIG. 2, a schematic diagram of an air circulation path 200 of the HVAC system 100 of FIG. 1 is shown according to an embodiment of the disclosure. It will be appreciated that while three zones 202, 204, 206 are shown, any number of zones may be present in an indoor space or structure 201. Where present, the plurality of zones may be conditioned independently or together in one or more groups. The air circulation path 200 of the HVAC system 100 may generally comprise a first zone supply duct 208, a second zone supply duct 210, a third zone supply duct 212, a first zone return duct 214, a second zone return duct 216, a third zone return duct 218, a main return duct 220, and a main supply duct 222. A plurality of zone dampers 224 may be optionally provided. The air circulation path 200 also passes through the indoor unit 102, which may include an indoor heat exchanger 108 and an indoor fan 110.

In operation, the indoor fan 110 may be configured to generate an airflow through the indoor unit 102 to deliver temperature conditioned air from an air supply opening in the indoor unit 102, through the main supply duct 222, and to each of the plurality of zones 202, 204, 206 through each of the first zone supply duct 208, the second zone supply duct 210, and the third zone supply duct 212, respectively. Additionally, each of the first zone supply duct 208, the second zone supply duct 210, and the third zone supply duct 212 may optionally comprise a zone damper 224 that regulates the airflow to each of the zones 202, 204, 206. In some embodiments, the zone dampers 224 may regulate the flow to each zone 202, 204, 206 in response to a temperature or humidity sensed by at least one temperature sensor and/or humidity sensor carried by at least one of the system controller 106, a zone thermostat 158, and a zone sensor 160. In some embodiments, system controller 106 may be located outside of each of the conditioned zones 202, 204, 206. In some embodiments, the system controller 106 may not include a temperature or humidity sensor, such that both the system controller 106 and a zone thermostat 158 or zone sensor 160 may be located within the same zone without duplicating functionality.

Air from each zone 202, 204, 206 may return to the main return duct 220 through each of the first zone return duct 214, the second zone return duct 216, and the third zone return duct 218. From the main return duct 220, air may return to the indoor unit 102 through an air return opening in the indoor unit 102. Air entering the indoor unit 102 through the air return opening may then be conditioned for delivery to each of the plurality of zones 202, 204, 206 as described above. Circulation of the air in this manner may continue repetitively until the temperature and/or humidity of the air within the zones 202, 204, 206 conforms to a target temperature as required by at least one of the system controller 106, the zone thermostat 158, and/or the zone sensor 160.

To operate the HVAC system 100 in the so-called fan-only mode, indoor fan 110 of indoor unit 102 may be operated to circulate air to the plurality of zones 202, 204, 206 of structure 201. When HVAC system 100 is operated in the fan-only mode, compressor 116 of outdoor unit 104 may not be operated so that refrigerant is not circulated through indoor heat exchanger 108. Thus, when HVAC system 100 is operated in the fan-only mode, air may be circulated to the plurality of zones 202, 204, 206 of structure 201 without conditioning the air via transferring heat between the air and refrigerant circulated through indoor heat exchanger 108.

As described above, during operation, a request may be communicated to fan controller 142 (shown in FIG. 1) of indoor fan 110 from system controller 106 (shown in FIG. 1) representative of, or corresponding to, a desired airflow. Based on this requested air flow command and prior knowledge of the performance of indoor fan 110 in the indoor product application, the system controller 106 may estimate the airflow and the external static pressure (ESP) provided by indoor fan 110 by continuously measuring motor speed and torque of the motor of indoor fan 110. Particularly, components of indoor unit 102, including indoor heat exchanger 108 and indoor fan 110, may be housed within a cabinet to form a self-contained air handling unit (AHU). Prior to installation of indoor unit 102 at structure 201, the AHU of indoor unit 102 (or another AHU similar in configuration to the AHU of indoor unit 102) may be tested at an air plenum test facility at a range of known airflows and ESPs (i.e., independently measured by equipment of the test facility) to thereby create AHU maps correlating airflow and ESP of the AHU with motor speed and torque of the indoor fan 110 of the AHU. As a non-limiting example, a first AHU map may include airflow along an X-axis thereof, motor power (which may be calculated from a measured motor torque) along a Y-axis thereof, and a plurality of curves each corresponding to a fixed motor speed. In this manner, an estimated airflow may be "looked-up" from the AHU map from a known motor speed and torque. A second AHU map may include airflow along an X-axis thereof, ESP along a Y-axis thereof, and a plurality of curves each corresponding to a fixed motor speed, from which an estimated ESP may be looked-up given the known motor speed and airflow (determined from the first AHU map). However, additional functional relationships for airflow and ESP may be used to correlate measured motor speed and torque with estimated airflow and ESP.

The AHU maps created during testing may be stored in the memory of the system controller 106. In this manner, system controller 106 of HVAC system 100 may apply measured motor speed and torque values communicated to system controller 106 from indoor fan controller 142 to the AHU maps stored in the memory of system controller 106 to thereby determine or look-up an estimated actual airflow of the indoor fan 110 corresponding to the measured motor speed and torque of the indoor fan 110. In some embodiments, the AHU maps may be stored in a memory of indoor fan controller 142, and indoor fan controller 142 may apply measured motor speed and torque values to the AHU maps stored in the memory thereof to determine the estimated airflow of indoor fan 110 corresponding to the measured motor speed and torque of the indoor fan 110.

Figure 3:
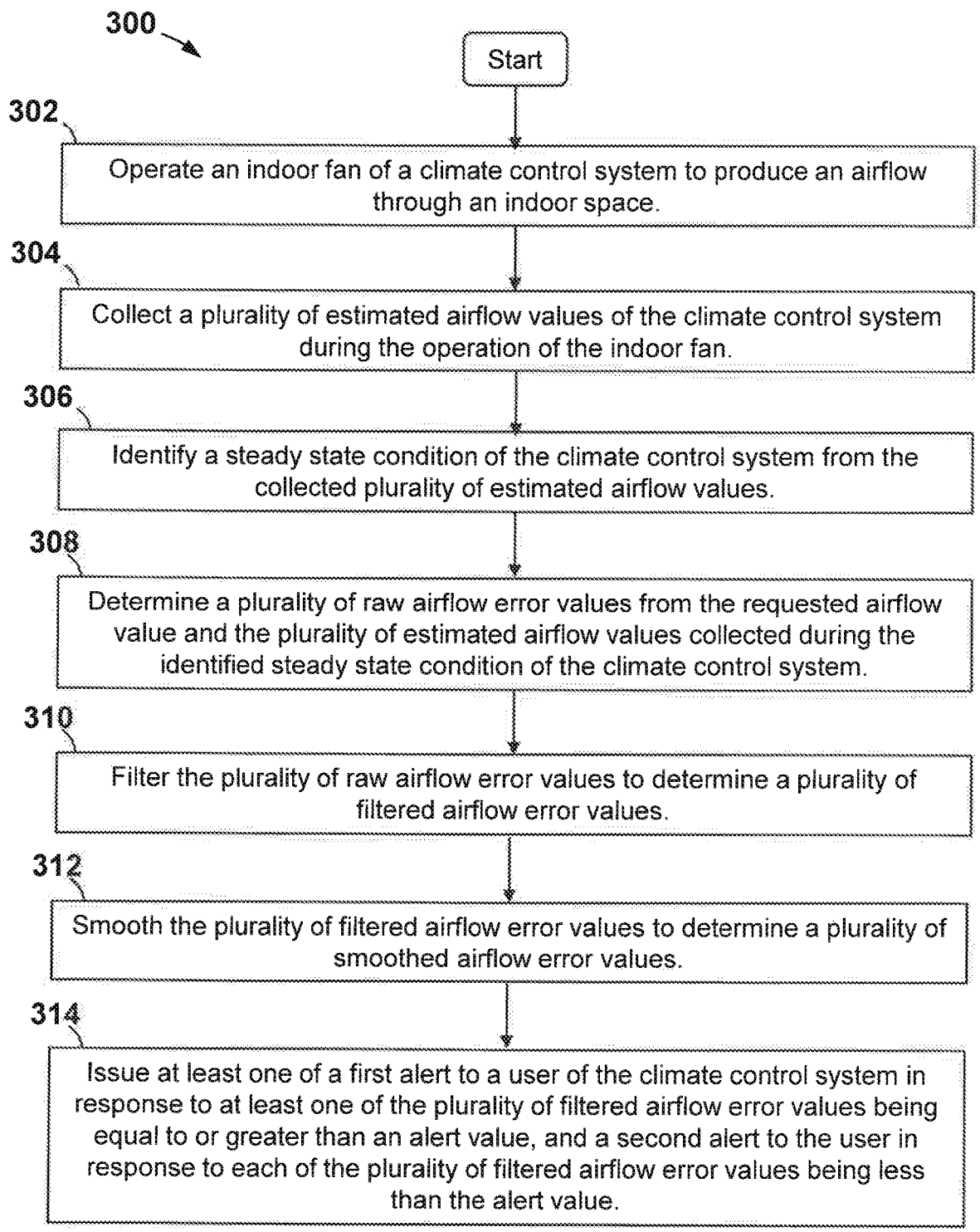
FIG. 3 is a flow chart of a method for detecting inaccurate airflow delivery of an indoor fan of a climate control system according to some embodiments.

Referring now to FIGS. 1-3, a method 300 for detecting inaccurate airflow delivery of an indoor unit of a climate control system is shown in FIG. 3. Thus, in describing the features of method 300, continuing reference will made to the HVAC system 100 shown in FIGS. 1, 2; however, it should be appreciated that embodiments of method 300 may be practiced with other systems, assemblies, and devices.

Generally speaking, method 300 includes identifying a steady state condition of a climate control system from a collected requested airflow value and a requested plurality of estimated airflow values. Method 300 also includes smoothing and filtering the requested airflow value and estimated airflow values collected during the identified steady state condition of the climate control system to determine a smoothed airflow error. Method 300 further includes providing a user of the climate control system (e.g., a homeowner and/or system installer of the climate control system) with an alert if the filtered airflow error is equal to or greater than a predetermined alert value, allowing the user to have the climate control system timely serviced to address the inaccurate airflow delivery issue. As will be described in more detail below, performance of some or all of the steps of method 300 may be cyclical or repeated during the lifetime of the climate control system so as to continually ensure an indoor unit of the climate control system is accurately delivering the requested airflow.

Initially, method 300 includes operating an indoor fan of a climate control system to produce an airflow through an indoor space. In some embodiments, block 302 comprises operating indoor fan 110 of the HVAC system 100 shown in FIGS. 1, 2 to produce an airflow through the structure 201 shown in FIG. 2. In certain embodiments, block 302 comprises operating indoor fan 110 of the HVAC system 100 shown in FIGS. 1, 2 to satisfy a request for cooling or heating. For example, system controller 106 may transmit a requested airflow value to the fan controller 142 of indoor fan 110 to operate indoor fan 110, the requested airflow value being representative of, or corresponding to, a desired airflow deemed sufficient by system controller 106 and/or indoor fan controller 142 for achieving a target temperature in one or more of zones 202, 204, 206 of structure 201. The determination of the requested airflow value by system controller 106 and/or indoor fan controller 142 may be based on, e.g., the configuration of indoor unit 102 and outdoor unit 104, the configuration of structure 201, and/or the thermal load applied to structure 201. System controller 106 may adjust the degree of requested airflow communicated to indoor fan controller 142 of indoor unit 102 in response to changing thermal loads applied to the indoor space cooled and heated by the climate control system and/or inputs to the system controller from a user of the climate control system (e.g., changes to a set point of the climate control system by the homeowner, etc.).

Following the operation of the indoor fan of the climate control system at block 302, method 300 proceeds by collecting a plurality of estimated airflow values of the indoor fan of the climate control system during the operation of the indoor fan at block 304. In some embodiments, block 304 comprises periodically logging the plurality of estimated airflow values communicated from indoor fan controller 142 to system controller 106 in the memory of system controller 106 during operation of the indoor fan 110 of HVAC system 100. Block 304 may also include periodically logging the requested airflow value communicated from system controller 106 to the indoor fan controller 142 in the memory of the system controller 106 during operation of indoor fan 110. In some embodiments, estimated airflow values are collected at fifteen second intervals; however, in other embodiments the frequency at which estimated airflow values are collected may vary. In other embodiments, block 304 may comprise periodically communicating estimated airflow values to communication network 132 for logging in a database stored in a remote server of communication network 132.

As described above, estimated airflow values may be determined or estimated by system controller 106 by comparing motor speed and torque values of the motor of indoor fan 110 communicated to system controller 106 from indoor fan controller 142 with pre-created AHU maps stored on the memory of system controller 106 to thereby estimate airflow from the measured motor speed and torque. In other embodiments, motor speed and torque values may be communicated to a server of communication network 132 on which the AHU maps are stored, and thus, the estimation of airflow values may be performed remotely on the server of communication network 132. In still other embodiments, airflow may be measured directly via an airflow sensor positioned in an air circulation path (e.g., air circulation path 200 shown in FIG. 2) of the climate control system.

Figure 4:
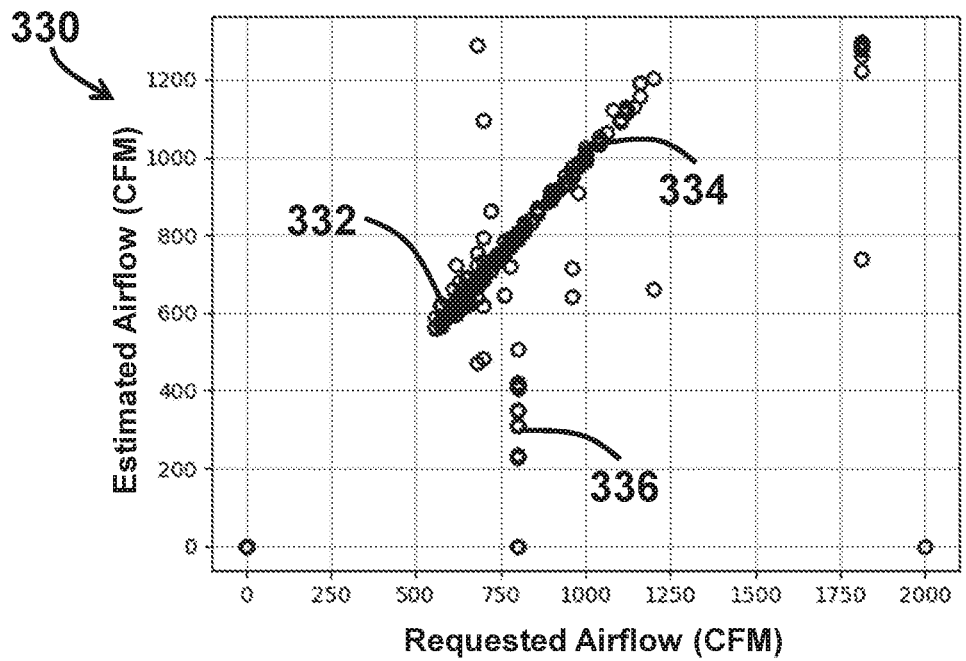
FIG. 4 is a graph illustrating estimated airflow values of a climate control system according to some embodiments.

Referring briefly to FIG. 4, an exemplary raw airflow chart 330 is shown that illustrates requested airflow in standard cubic feet per minute (CFM) on an X-axis thereof and estimated airflow (estimated from motor speed and torque of the motor of indoor fan 110) in CFM on a Y-axis thereof. Circles 332 of raw airflow chart 330 depict exemplary estimated airflow values as a function of requested airflow values, where the estimated airflow values and requested airflow values comprising circles 332 were obtained from an exemplary climate control system over an extended period of time (e.g., a week or longer). Circles 332 shown in raw airflow chart 330 includes both values collected when the climate control system was in a steady state condition (e.g., circle 334 shown in FIG. 3), and values collected when the climate control system was in a non-steady state condition, such as values collected immediately following a change in requested airflow (e.g., circle 336 shown in FIG. 3). As described above, given that estimated airflow cannot equal requested airflow immediately following a change in requested airflow due to lag in indoor fan 110 in adjusting fan speed, circle 336 represents noise that may be filtered to determine whether HVAC system 100 is accurately delivering airflow in accordance with the requested airflow requested by system controller 106.

Referring again to FIG. 3, method 300 also includes identifying a steady state condition of the climate control system from the collected plurality of estimated airflow values at block 306. In some embodiments, block 306 of method 300 includes employing a moving window approach where a moving window of collected estimated airflow values having a fixed size is defined and the range of estimated airflow values within the window is examined to determine whether the range is less than a predetermined threshold range. As a non-limiting example, and not intending to be bound by any theory, the range of the moving window may be determined in accordance with the following computation, where $\text{Airflow}_{max}$ comprises the maximum estimated airflow value collected within the moving window, $\text{Airflow}_{min}$ comprises the minimum estimated airflow collected within the moving window, and $\text{Airflow}_{mean}$ comprises the mean estimated airflow value of the estimated airflow values collected within the moving window:

$$\text{Range} = \frac{\text{Airflow}_{max} - \text{Airflow}_{min}}{\text{Airflow}_{mean}} \tag{1}$$

For example, in an embodiment where the moving window has a size of ten estimated airflow values, a first change in requested airflow may be identified and the first ten estimated airflow values following the identified first change in requested airflow may comprise an initial window of estimated airflow values. The range of the collected estimated airflow values may be determined in accordance with Equation (1) presented above. If the range of the estimated airflow values is less than the threshold range, then a steady state of the climate control system (e.g., HVAC system 100 shown in FIGS. 1, 2) is identified. In some embodiments, the threshold range may be approximately between 0.01-0.2; however, in other embodiments the threshold range may vary.

If the range is not less than the threshold range, then a new or second window is defined which replaces the first (earliest in time) estimated airflow value of the initial moving window with the estimated airflow value immediately following the tenth (latest in time) estimated airflow value of the initial window. Similarly, a range of the second window may be determined in accordance with Equation (1) and compared with the threshold range. If the range of the second window is less than the threshold range then a steady state condition of the climate control system is identified; however, if the range of the second window is not less than the threshold range, then a third window is created and the process continues. In some embodiments, new moving windows (e.g., third, fourth, fifth, sixth moving windows, etc.) are created until a steady state condition of the climate control system is detected. Once a steady state condition is detected, the subset of collected estimated airflow values delimited by the first estimated airflow value of the window during which steady state detection occurred and the estimated airflow value that immediately precedes a subsequent change in requested airflow are identified as collected during a steady state condition of the climate control system.

In other embodiments, the process of creating windows of estimated airflow values and comparing the range of the created window and the threshold range only occurs for a predetermined or maximum time period of sufficient duration such that a steady state condition should have been conservatively achieved, and thus, the estimated airflow values collected at a time following the maximum time period are identified as collected during a steady state condition of the climate control system. For example, in an embodiment where the maximum time period comprises 300 seconds, if a first change in requested airflow occurs, for example, at time=10 second, then the process of creating windows of estimated airflow values proceeds until either a steady state condition of the climate control system is detected or until a final window including an estimated airflow value collected at time=310 seconds is analyzed. In this example, if the range of the final window is greater than the threshold range then the process is terminated and the estimated airflow values collected at a time equal to or greater than 310 seconds until a second change in requested airflow is detected are identified as collected during a steady state condition of the climate control system. A maximum time period allows for the identification of as much robust steady state data as possible. In some embodiments, the maximum time period may range between approximately 200-600 seconds; however, in other embodiments the maximum time period may vary.

In some embodiments, the first estimated airflow value of the initial window following an identified change in requested airflow comprises the estimated airflow value collected immediately following the change in requested airflow. However, in other embodiments, the first estimated airflow value of the initial window comprises an estimated airflow value following a predetermined minimum time period from the identified change in requested airflow. For example, in an embodiment where the minimum time period comprises 30 seconds, if a first change in requested airflow occurs, for example, at time=10 seconds, then the first estimated airflow value of the initial window occurs at 40 seconds. A minimum time period may be used to prevent steady state detection earlier than can robustly be achieved (a false positive) following a change in requested airflow. In some embodiments, the minimum time period comprises approximately between 10-120 seconds; however, in other embodiments the minimum time period may vary.

Figure 5:
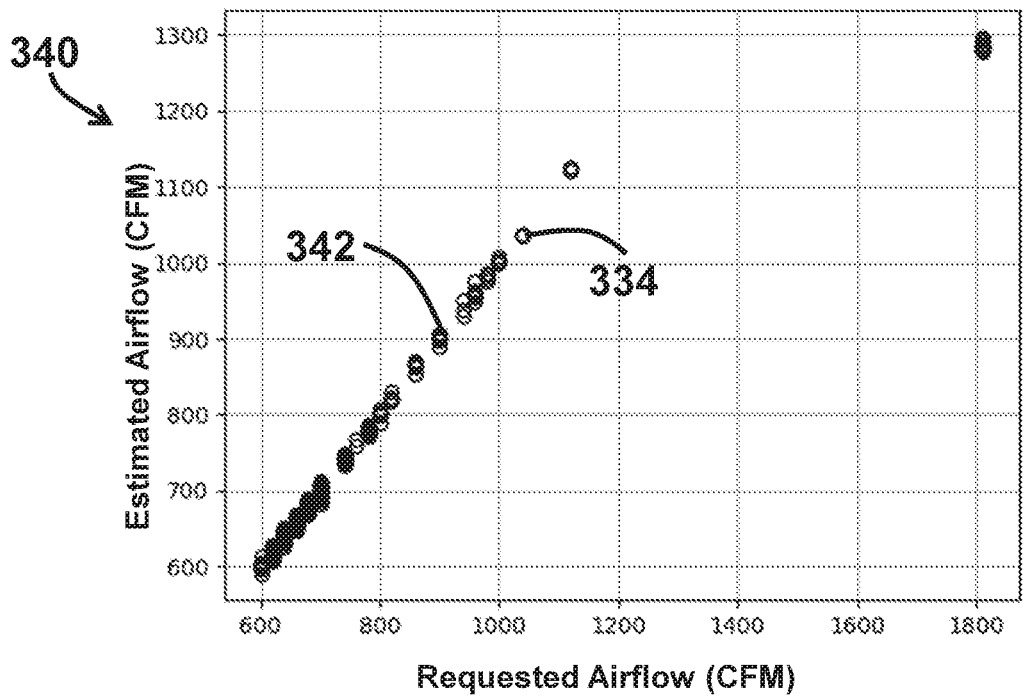
FIG. 5 is a graph illustrating estimated airflow values of a climate control system collected during a steady state condition of the climate control system according to some embodiments.

Referring briefly to FIG. 5, an exemplary steady state airflow chart 340 is shown that illustrates requested airflow in standard cubic feet per minute (CFM) on an X-axis thereof and estimated airflow (estimated from motor speed and torque of the motor of indoor fan 110) in CFM on a Y-axis thereof. Circles 342 of raw airflow chart 330 depict exemplary estimated airflow values as a function of requested airflow values, where the estimated airflow values and requested airflow values comprising circles 342 were obtained from an exemplary climate control system over an extended period of time (e.g., a week or longer). Additionally, the estimated airflow values and requested airflow values comprising circles 342 were collected only when the climate control system was in a steady state condition. Thus, circles 342 shown in steady state airflow chart 340 includes only estimated airflow values collected during the steady state condition (e.g., circle 334), and does not include any non-steady state values (e.g., circle 336 shown in FIG. 4) collected, e.g., immediately following a change in requested airflow of the climate control system. Thus, and as will be discussed further herein, while circles 342 pertain to a plurality of requested airflow values, the estimated airflow value corresponding to each circle 342 after a sufficient time had elapsed since a preceding change in requested airflow to allow the climate control system to achieve a steady state condition where the airflow through the climate control system has sufficiently stabilized. For instance, the circle 342 shown in steady state airflow chart 340 corresponding to a requested airflow value of approximately 1000 CFM and an estimated airflow of approximately 1010 CFM was collected following a change to a requested airflow of 1000 CFM, but after a sufficient time had elapsed following the change in requested airflow to 1000 CFM to allow the climate control system to achieve a steady state condition.

Referring again to FIG. 3, once a steady state condition of the climate control system is detected at block 306, method 300 proceeds by determining a plurality of raw airflow error values between the requested airflow value and the plurality of estimated airflow values collected during the identified steady state condition of the climate control system at block 308 of method 300. In some embodiments, the plurality of raw airflow error values of block 308 are determined from the difference between the requested airflow value and the plurality of estimated airflow values collected during the steady state condition of the climate control system identified at block 306 of method 300.

As a non-limiting example, and not intending to be bound by any theory, the plurality of raw airflow error values may be determined in accordance with the following computation, where $REV_i$ is the raw airflow error value at time $t_i$, RF is the requested airflow value for the identified steady state condition, and $EF_i$ is the estimated airflow value collected at time $t_i$:

$$REV_i = EF_i - RF \qquad (2)$$

In accordance with Equation (2) above, if a requested airflow value RF, and three estimated airflow values ($EF_1$, $EF_2$, and $EF_3$) occur during a steady state condition of the climate control system at times $t_1$, $t_2$, and $t_3$, respectively, then three raw airflow error values ($REV_1$, $REV_2$, and $REV_3$) may be obtained using Equation (2) above where $REV_1$ is the raw airflow error value at time $t_1$, $REV_2$ is the raw airflow error at time $t_2$, and $REV_3$ is the raw airflow error value at time $t_3$.

Once the plurality of raw airflow error values are obtained at block 308, method 300 proceeds by filtering the plurality of raw airflow error values to determine a plurality of filtered airflow error values at block 310. In some embodiments, block 310 comprises filtering spurious raw airflow error values of the plurality of raw airflow error values resulting from interactions between different software, communication bus refreshing, etc., and spurious raw airflow error values resulting from, e.g., lack of synchronization between different sources of data, such as lack of synchronization between at least some of the plurality of estimated airflow values and the requested airflow values.

For example, repeated raw airflow error values may be identified and removed by identifying repeated estimated ESP values as ESP values combine signal noise of both the estimated motor speed and torque of indoor fan 110 and thus are only likely to repeat due to data handling or manipulation issues. Therefore, block 310 may include looking-up an estimated ESP value from the previously described AHU maps corresponding to each raw airflow error value, comparing neighboring estimated ESP values, and removing raw airflow error values which correspond to a repeated estimated ESP value. For example, if three estimated ESP values ($ESP_1$, $ESP_2$, and $ESP_3$) and three raw airflow error values ($REV_1$, $REV_2$, and $REV_3$) occur during a steady state condition of the climate control system at times $t_1$, $t_2$, and $t_3$, respectively, and the third ESP value $ESP_3$ collected at time $t_3$ is equal to the second estimated ESP value $ESP_2$ collected at time $t_2$, then the third raw airflow error value $REV_3$ collected at time $t_3$ may be removed as a repeated raw airflow error value.

Following the removal of any repeated raw airflow error values, spurious raw airflow error values may be removed by applying a median filter (e.g., a median filter having a window size of three) to any raw airflow errors which exceed a predetermined maximum airflow error value that is sufficiently great enough in magnitude to suggest that an error as great or greater in magnitude is spurious. For example, with a median filter having a window size of three including neighboring raw airflow error values $RAV_1$, $RAV_2$, $RAV_3$, any raw airflow error value of $RAV_1$-$RAV_3$ that is greater than the maximum airflow error value is replaced by the median raw airflow error value of $RAV_1$, $RAV_2$, $RAV_3$. Thus, if in this example $RAV_1$ equals 5 CFM, $RAV_2$ equals 50 CFM, $RAV_3$ equals 10 CFM, and the maximum airflow error value is 20 CFM, then $RAV_2$, which is greater than the maximum airflow error value, may be replaced with a raw airflow error value equaling 10 CFM—the median raw airflow error value of $RAV_1$-$RAV_3$. By limiting use of the median filter to raw airflow errors that exceed the maximum airflow error value, alteration of the raw airflow error values may be minimized while eliminating any raw airflow error values that are likely to be spurious. In some embodiments, the maximum airflow error value is approximately between 10-100 CFM; however, in other embodiments the maximum airflow error value may vary. A plurality of filtered airflow error values may thereby be determined once repeated and spurious raw airflow error values are removed.

Following the determination of the plurality of filtered airflow error values at block 310, method 300 proceeds by smoothing the plurality of filtered airflow error values determined at block 310 to thereby determine a plurality of smoothed airflow error values at block 312. In some embodiments, block 312 comprises applying a gain to the difference between neighboring filtered airflow error values when the difference between neighboring filtered airflow error values is equal to or greater than a predetermined maximum error difference. In some embodiments, the maximum error difference comprises approximately between 10-100 CFM; however, in other embodiments the maximum error difference may vary.

In some embodiments, block 312 comprises replacing a second filtered airflow error value of a neighboring pair of filtered airflow error values with a sum comprising a first filtered airflow error value of the neighboring pair of filtered airflow errors and a difference between the first and second filtered airflow error values multiplied by a gain in response to the difference between the first and second filtered airflow error values being equal to or greater than a predetermined maximum error difference. As a non-limiting example, and not intending to be bound by any theory, a plurality of smoothed airflow error values may be determined using the following computation, where $FEV_1$ is a first filtered airflow error value of a neighboring pair of filtered airflow values at time $t_1$, $FEV_2$ is a second filtered airflow error value of the neighboring pair of filtered airflow values at time $t_2$, $SEV_2$ is the smoothed airflow error value at time $t_2$, and G is the gain:

$$SEV_2 = FEV_1 + G \times (FEV_2 - FEV_1) \quad (3)$$

In an embodiment where the maximum error difference is 20 CFM, if $FEV_1$ is 200 CFM and $FEV_2$ is 220 CFM, then, using Equation (3) above, in this example $SEV_2$ is 205 CFM (i.e., 200 CFM+0.25*(20 CFM)=205 CFM). In some embodiments, the value of the gain applied at block 312 is approximately 0.1-0.9; however, in other embodiments the value of the gain applied at block 312 may vary.

Following the determination of the plurality of smoothed airflow error values at block 312, method 300 proceeds by issuing at least one of a first alert to a user of the climate control system in response to at least one of the plurality of smoothed airflow error values being equal to or greater than a predetermined alert value, and a second alert to the user in response to each of the plurality of smoothed airflow error values being less than the alert value at block 314. In some embodiments, method 300 may not include block 312, and thus, block 314 may comprise issuing, for example, the first alert to the user of the climate control system in response to the raw airflow error determined at block 308 or the filtered airflow error determined at block 310 being equal to or greater than a predetermined alert value. The first alert may therefore be classified as a warning and the optional second alert may provide the operator or technician with notice that the climate control system is operating substantially as designed.

In some embodiments, the alert value comprises a percentage of the requested airflow value for the steady state condition, and thus block 314 may comprise comparing the plurality of smoothed airflow error values determined at block 312 with a fixed percentage of the corresponding requested airflow value. For example, in an embodiment where the alert value is a 15% or greater reduction from a requested airflow (RF) equaling 1100 CFM during the steady state condition, and three smoothed airflow error values ($SEV_1$=160 CFM, $SEV_2$=165 CFM, and $SEV_3$=170 CFM) are determined for times $t_1$, $t_2$, and $t_3$ during the steady state condition, respectively, then a first alert may be issued given that both the $SEV_2$ and $SEV_3$ smoothed airflow error values in this example equal or exceed the alert value (0.15*1, 100 CFM=165 CFM). While in this embodiment the alert value comprises a 15% or greater reduction from the requested airflow, in other embodiments the first alert value may comprise a reduction that is greater or less than 15% from the requested airflow value. Although in the above example the alert value is a percentage reduction from the requested airflow value of the steady state condition, in some embodiments, the alert value may comprise a percentage (e.g., 15% or greater) increase from the requested airflow value of the steady state condition. In some embodiments, the alert value may correspond or be set by applicable regulatory standards.

In certain embodiments, block 314 may comprise comparing the plurality of raw airflow error values determined at block 308 with a fixed percentage of the corresponding requested airflow value. In other words, the method 300 for detecting inaccurate airflow may exclude the determination of the plurality of filtered airflow error values at block 310 and the determination of the plurality of smoothed airflow error values at block 312, and may move directly from determining the plurality of raw airflow error values at block 308 to issuing at least one of a first alert to the user of the climate control system in response to at least one of the plurality of raw airflow error values being greater than a predetermined value, and a second alert to the user in response to each of the plurality of raw airflow error values being less than the predetermined value.

In some embodiments, block 314 includes determining a mean smoothed airflow error from the plurality of smoothed airflow error values collected during a steady state condition of the climate control system, and determining an alert value corresponding to a percentage reduction (e.g., 15%, etc.) from the requested airflow value of the steady state condition. The mean smoothed airflow error may then be compared to the percentage of the requested airflow value to determine whether the first alert or the second alert should be issued to the user of the climate control system.

Block 314 of method 300 may include producing a visual or graphic alert on I/O unit 107 of HVAC system 100 to inform the homeowner that the indoor unit 102 of HVAC system 100 needs to be serviced to address the inaccurate airflow delivery provided by indoor unit 102. For example, I/O unit 107 and/or device 130 of HVAC system 100 may graphically illustrate a first alert comprising a "Fail" visual indication if at least one of the plurality of smoothed airflow error values is greater than the alert value, and a second alert comprising a "Pass" visual indication if each of the smoothed airflow error values is less than the alert value.

In some embodiments, method 300 may further comprise transmitting the plurality of smoothed airflow error values from a system controller (e.g., system controller 106) to an indoor fan controller (e.g., indoor fan controller 142 shown in FIG. 1) of the indoor fan (e.g., indoor fan 110 shown in FIGS. 1, 2) of the climate control system, and adjusting a speed and a torque of a motor of the indoor fan using the indoor fan controller based on the plurality of smoothed airflow error values. For instance, in response to the smoothed airflow error values indicating that the airflow produced by the indoor fan is persistently less than the airflow requested by the system controller during a steady state condition of the climate control system, the indoor fan controller may increase the motor speed and torque of the motor of the indoor fan to thereby increase the airflow produced by the indoor fan so that it more accurately corresponds to the airflow requested by the system controller. In other embodiments, if the estimated airflow is lagging the requested airflow, a controller (e.g. 106 or 142), may attempt to request a second, higher airflow, such that the lag of the estimated airflow below the second requested airflow may be closer to achieving the desired airflow as initially requested.

In certain embodiments, block 314 comprises communicating the alert to the device 130 of HVAC system 100 via communication network 132. For example, device 130 may comprise a server accessible by a system installer of HVAC system 100, and in this manner the system installer may be informed of the required servicing of indoor unit 102 by accessing device 130. In some embodiments, servicing the indoor unit in response to receiving an alert may comprise a user of the climate control system (e.g., a homeowner, an installer of the climate control system, and/or a technician equipped to service the climate control system) replacing a fouled air cleaner (e.g., air cleaner 136) and/or heat exchanger (e.g., indoor heat exchanger 108). In some embodiments, servicing the indoor unit in response to receiving an alert may also comprise the user cleaning or repairing ducts of the climate control system (e.g., ducts 208, 210, 212, 214, 215, 218, 220, and/or 220 shown in FIG. 2) to reduce the resistance to airflow therethrough. Once the climate control system has been serviced to correct the inaccurate airflow delivered by the indoor unit of the climate control system, method 300 returns to block 304 and begins collecting the requested airflow value and the plurality of estimated airflow values once the climate control system has returned to operation.

The collecting of the plurality of estimated airflow values at block 304, identification of the steady state condition of the climate control system at block 306, determination of the plurality of raw airflow error values at block 308, determination of the plurality of filtered airflow error values at block 310, determination of the plurality of smoothed airflow error values at block 312, and issuing of at least one of the first alert and the second alert to the user of the climate control system at block 314 may be performed locally via a system controller of the climate control system or remotely via a remote server in signal communication with the system controller. For example, the aforementioned steps performed at blocks 304-314 of method 300 may be executed by the processor of system controller 106 via machine readable instructions provided on the memory of system controller 106. In other embodiments, the steps performed at blocks 304-314 of method 300 may be executed by a processor of a remote serer of communication network 132 via machine readable instructions provided on a memory of the remote server.

Figure 6:
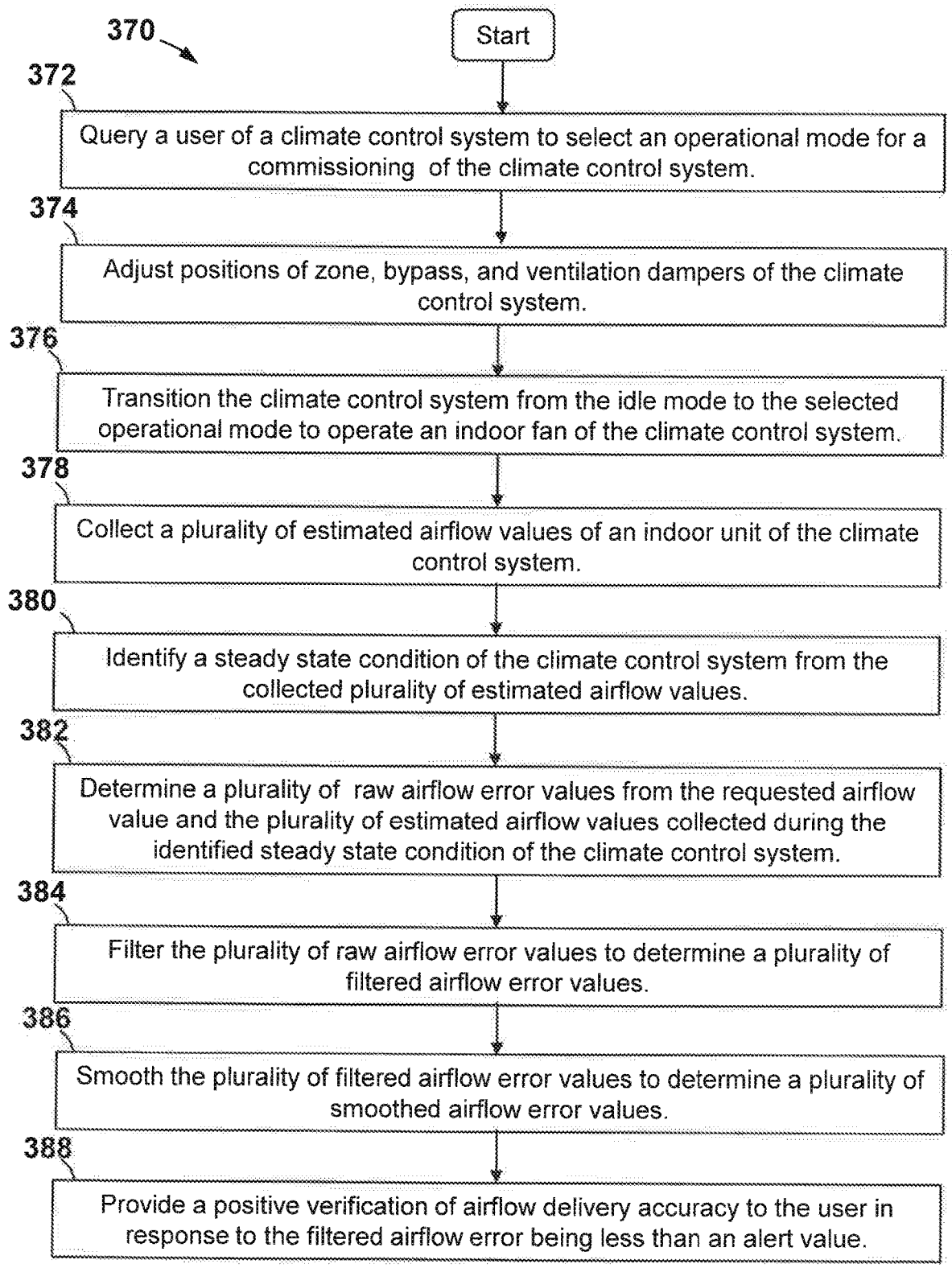
FIG. 6 is a flow chart of a method for commissioning a climate control system according to some embodiments.

As described above, the accuracy of the airflow delivered by an indoor unit of a climate control system (e.g., indoor unit 102 of the HVAC system 100 shown in FIGS. 1, 2) may be verified upon the commissioning of the climate control system following installation of the system. Referring now to FIGS. 1, 2, and 6, a method 370 for commissioning a climate control system is shown in FIG. 6. Generally speaking, method 370 includes verifying the accuracy of the airflow delivery of an indoor unit of the climate control system. In some embodiments, method 370 may be practiced with HVAC system 100. Thus, in describing the features of method 370, continuing reference will made to the HVAC system 100 shown in FIGS. 1, 2; however, it should be appreciated that embodiments of method 300 may be practiced with other systems, assemblies, and devices.

Initially, method 370 includes querying a user of the climate control system to select an operational mode for a commissioning of the climate control system at block 372. In some embodiments, the user comprises an installer of the climate control system and thus block 372 may comprise querying an installer to select between heating, cooling, and fan-only modes of the climate control system. The climate control system may be an idle mode at block 372 where neither an indoor fan (e.g., indoor fan 110 of HVAC system 100 shown in FIG. 1) nor an outdoor fan (e.g., outdoor fan 118 of HVAC system 100 shown in FIG. 1) produces an airflow. Block 372 may comprise displaying a graphic on the I/O unit 107 of HVAC system 100 instructing an installer of HVAC system 100 to select one of a fan-only, a cooling, and a heating mode of the HVAC system 100 for commissioning HVAC system 100. The user may enter the selected operational mode into I/O unit 107, and the selected operational mode may be communicated from I/O unit 107 and/or device 130 to system controller 106.

Once an operational mode for commissioning the climate control system has been selected by the user at block 372, method 370 proceeds by adjusting positions of zone, bypass, and ventilation or accessory dampers of the climate control system at block 374. In some embodiments, block 374 comprises opening each zone damper and closing each bypass and ventilation damper of the climate control system. For example, block 374 may comprise transmitting a command from system controller 106 of the HVAC system 100 shown in FIGS. 1, 2 to a motor controller of each zone damper 224 (shown in FIG. 2) instructing a motor of the zone damper 224 to actuate the zone damper 224 into an open position. Block 374 may also comprise transmitting a command from system controller 106 of HVAC system 100 to a motor controller of each bypass and ventilation damper (not shown in FIGS. 1, 2) of HVAC system 100 instructing a motor of each bypass and ventilation damper to actuate the bypass and ventilation damper into a closed position. Alternatively, the user of the climate control system may manually actuate each zone damper into the open position and manually actuate each bypass damper and ventilation damper into the closed position.

Block 374 of method 370 may further include opening (e.g., via the installer of the climate control system) any floor and/or ceiling registers of the climate control system. As will be described further herein, the opening of zone, bypass, and ventilation dampers (and floor and ceiling registers where applicable) allows for the accuracy of the airflow delivery of the climate control system to be evaluated or tested without the influence of dampers, registers, and/or other controllable airflow obstructions which interfere or obstruct the delivery of airflow when disposed in a closed position. In some embodiments, method 370 may not include block 374. For instance, method 370 may not include block 374 when commissioning a climate control system that is not zoned and thus does not include zone dampers (e.g., zone dampers 224 of structure 201 shown in FIG. 2).

Following the adjustment of the dampers of the climate control system at block 374, method 370 proceeds by transitioning the climate control system from the idle mode to the selected operational mode to operate an indoor fan of the climate control system at block 376. In some embodiments, block 376 comprises communicating an airflow request or request from system controller 106 to the fan controller 142 of the indoor fan 110 of HVAC system 100 for a predetermined fan-only commissioning time period in response to the selection of the fan-only mode, for a predetermined cooling commissioning time period in response to the selection of the cooling mode, or for a predetermined heating commissioning time period in response to the selection of the heating mode. As will be described further herein, the heating commissioning time period and cooling commissioning time period may each be greater than the fan-only commissioning time period. The airflow request may comprise a single requested airflow value communicated continuously over a predetermined fan-only commissioning time period based upon the operational mode selected at block 372. In some embodiments, the airflow request is dependent upon the operational mode selected at block 372. The airflow request may be predetermined during commissioning with the fan-only operation, or may be dependent upon demand if the method is conducted in a heating or cooling mode. In some embodiments, the fan-only commissioning time period over which the requested airflow value is communicated from system controller 106 to fan controller 142 may be approximately 3.5 minutes when the user selects the fan-only mode; however, in other embodiments the fan-only commissioning time period for the fan-only mode may vary. The climate control system (e.g., HVAC system 100) may return to the idle mode at the termination of the fan-only commissioning time period.

Block 376 may include, in addition to communicating an airflow request from system controller 106 to the fan controller 142 of indoor fan 110, communicating a request from system controller 106 to outdoor controller 126 to actuate the compressor 116 to provide a requested refrigerant flow for a predetermined cooling/heating commissioning time period when either the cooling or heating mode is selected by the user at block 372. System controller 106 may communicate the requested airflow value continuously to fan controller 142 over the course of the cooling/heating commissioning time period. The cooling/heating commissioning time period may be greater in duration (e.g., ten or more minutes in duration) than the fan-only commissioning time period given that the addition of heating or cooling may delay the onset of a steady state condition of the climate control system. For example, a climate control system comprising a refrigeration system may require an extended period of time (e.g., 15-20 minutes) to reach a steady state. If commissioning of the climate control system is performed concurrent with a cooling and/or heating time period (i.e., a time period required by the climate control system to cool/heat an indoor space to a target temperature and/or humidity), then the climate control system in the heating/cooling mode may need to reach a steady state or a predetermined period may need to elapse before estimated airflow values identified as steady state may be considered valid for determining the accuracy of the airflow delivery of the climate control system. The climate control system (e.g., HVAC system 100) may return to the idle mode at the termination of the cooling/heating commissioning time period.

Following the transition of the climate control system from the idle mode to the selected operational mode at block 376, method 370 proceeds by collecting a plurality of estimated airflow values of an indoor unit of the climate control system at block 378. The collection of the plurality of estimated airflow values at block 378 continues until the termination of either the fan-only commissioning time period (if the fan-only mode is selected at block 372) or the termination of the cooling/heating commissioning time period (if either the cooling or heating mode is selected at block 372), at which point the climate control system returns to the idle mode and the requested airflow returns to zero. Once the plurality of estimated airflow values are collected at block 378, a steady state condition of the climate control system is identified at block 380, a plurality of raw airflow error values are determined at block 382, a plurality of filtered airflow error values are determined at block 384, and a plurality of smoothed airflow error values are determined at block 386. Block 378 is similar in configuration to block 304 of method 300 shown in FIG. 3, and thus will not be described in detail. Similarly, blocks 380, 382, and 384 of method 370 are similar in configuration to blocks 306, 308, 310, and 312 of method 300, respectively, and thus will also not be described in detail.

Once the plurality of smoothed airflow error values are determined at block 386, method 388 proceeds by providing a positive verification of airflow delivery accuracy to the user in response to each of the plurality of filtered airflow error values determined at block 386 being less than an alert value. Similar to block 314 of the method 300 shown in FIG. 3, the alert value of block 388 may comprise a percentage of the requested airflow value of the steady state condition, and thus block 388 may comprise comparing the plurality of smoothed airflow error values determined at block 386 with a fixed percentage of the corresponding requested airflow value. For example, in an embodiment where the alert value is a 15% or greater reduction from the requested airflow, if the requested airflow value is approximately 1,100 CFM (i.e., DF=1100 CFM) during a steady state condition of the climate control system, and three smoothed airflow error values ($SEV_1$=150 CFM, $SEV_2$=145 CFM, and $SEV_3$=140 CFM) are determined for times $t_1$, $t_2$, and $t_3$, respectively, during the steady state condition, then a positive indication of airflow delivery accuracy may be provided to the user given that each of the $SEV_1$, $SEV_2$, and $SEV_3$ smoothed airflow error values in this example are less than the alert value (0.15*(1,100 CFM)=165 CFM). In some embodiments, block 388 includes determining a mean smoothed airflow error from the plurality of smoothed airflow error values collected during the steady state condition of the climate control system, and determining an alert value corresponding to a percentage reduction (e.g., 15%, etc.) from the requested airflow value of the steady state condition.

In some embodiments, block 386 comprises graphically depicting a positive verification via the I/O unit 107 and/or device 130 of the HVAC system 100 shown in FIGS. 1, 2 in response to the filtered airflow error determined at block 386 being less than an alert value. For example, I/O unit 107 and/or device 130 may graphically illustrate a "Pass" visual indication if each of the smoothed airflow error values is less than the alert value and a "Fail" visual indication if at least one of the plurality of smoothed airflow error values is greater than the alert value. I/O unit 107 and/or device 130 may also graphically illustrate a graph depicting the requested airflow value and estimated airflow values collected at block 378 as a function of time. In this manner, the user (e.g., the installer of the climate control system) may be notified of the accuracy of the airflow delivery of the indoor unit of the climate control system without needing to utilize any additional personnel or specialized commissioning equipment (e.g., additional flow or pressure sensors for measuring airflow, etc.) for verifying the accuracy of the airflow delivery. Instead, method 370 of FIG. 6 permits a user to verify the accuracy of the airflow delivered by the indoor unit by only utilizing components (e.g., system controller 106, fan controller 142 and indoor fan 110 of HVAC system 100 shown in FIGS. 1, 2) of the climate control system itself, thereby minimizing the time and cost required for commissioning the climate control system.

Referring to FIGS. 1-4, through use of the systems and methods described herein (e.g., HVAC system 100, methods 300, etc.), inaccurate airflow delivery of an indoor fan of a climate control system may be promptly and accurately detected such that the climate control system may be serviced to address the issue of inaccurate airflow delivery. Specifically, a climate control system for an indoor space (e.g., HVAC system 100 and indoor space 201) may be operated by operating an indoor fan of the climate control system to satisfy a request for cooling or heating of the indoor space, collecting a requested airflow value and estimated airflows values (e.g., the requested airflow value and estimated airflow values collated at block 304 of method 300), identifying a steady state condition of the climate control system from the collected requested airflow value and estimated airflow values (e.g., steady state identification at block 306 of method 300) to determine an airflow error (e.g., the airflow errors determined at blocks 308, 310, and 312 of method 300), and issuing an alert to a user of the climate control system in response to the airflow error being equal to or greater than a predetermined alert value. In this manner, non-steady state data that increases the difficulty of detecting inaccurate airflow may be filtered to allow a prompt and accurate detection of inaccurate airflow delivery.

Additionally, through use of the systems and methods described herein (e.g., HVAC system 100, method 370, etc.), a commissioning of a climate control system may be performed in which the accuracy of the airflow delivery of an indoor fan of the climate control system may be verified. Specifically, a climate control system for an indoor space (e.g., HVAC system 100 and indoor space 201) may be operated by querying a user of the climate control system (e.g., an installer of the climate control system) to select an operational mode of the climate control system, transitioning the climate control system from an idle mode to the selected operational mode to operate an indoor fan of the climate control system, collecting a requested airflow value and a plurality of estimated airflows values (e.g., the requested airflow value and estimated airflow values collated at block 378 of method 370), identifying a steady state condition of the climate control system from the collected requested airflow value and estimated airflow values (e.g., steady state identification at block 380 of method 370) to determine an airflow error (e.g., the airflow errors determined at blocks 382, 384, and 386 of method 370), and providing a positive verification of airflow delivery accuracy to the user in response to the airflow error determined being less than an alert value. In this manner, the climate control system itself may be utilized for performing the commissioning procedure without needing to rely on additional personnel having specialized commissioning equipment for verifying the accuracy of the airflow delivery of the indoor fan of the climate control system.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method for detecting inaccurate airflow delivery of an indoor unit of a climate control system, comprises:
    (a) operating an indoor fan of the climate control system to produce an airflow through an indoor space by transmitting a requested airflow value from a system controller of the climate control system to a fan controller of the indoor fan;
    (b) collecting a plurality of estimated airflow values of the indoor fan estimated by the system controller during the operation of the indoor fan;
    (c) identifying a steady state condition of the climate control system from the plurality of estimated airflow values;
    (d) determining a plurality of airflow error values from the requested airflow value and the plurality of estimated airflow values collected during the steady state condition; and
    (e) issuing at least one of a first alert to a user of the climate control system in response to at least one of the plurality of airflow error values being equal to or greater than an alert value, and a second alert to the user in response to each of the plurality of airflow error values being less than the alert value.

2. The method of claim 1, further comprising:
    (f) filtering the plurality of airflow error values to determine a plurality of filtered airflow error values; and
    (g) smoothing the plurality of filtered airflow error values to determine a plurality of smoothed airflow error values;
    wherein (e) comprises issuing at least one of the first alert to the user of the climate control system in response to at least one of the plurality of smoothed airflow error values being equal to or greater than the alert value, and the second alert to the user in response to each of the plurality of smoothed airflow error values being less than the alert value.

3. The method of claim 2, wherein (f) comprises:
    (f1) removing any of the plurality of airflow error values collected during the steady state condition that are repeated; and
    (f2) applying a median filter to any of the plurality of airflow error values which exceed a predetermined maximum airflow error value.

4. The method of claim 3, wherein (f1) comprises collecting a plurality of estimated external static pressure (ESP) values of the indoor fan estimated by the system controller, identifying any of the plurality of estimated ESP values which are repeated, and removing the airflow error values corresponding to the repeated estimated ESP values.

5. The method of claim 2, wherein (g) comprises:
(g1) replacing a second filtered airflow error value of a neighboring pair of filtered airflow error values with a sum comprising a first filtered airflow error value of the neighboring pair of filtered airflow errors and a difference between the first and second airflow errors multiplied by a gain in response to the difference between the first and second filtered airflow error values being equal to or greater than a predetermined maximum error difference.

6. The method of claim 1, wherein (c) comprises:
(c1) defining a moving window of the plurality of estimated airflow values having a fixed size;
(c2) determining a range of the plurality of estimated airflow values within the moving window;
(c3) replacing the estimated airflow value collected at the earliest point in time among the estimated airflow values within the moving window with the estimated airflow value collected immediately following the estimated airflow value collected at the latest point in time among the estimated airflow values within the moving window in response to the range being equal to or greater than a predetermined threshold range; and
(c4) identifying the steady state condition in response to the range being less than the predetermined threshold range.

7. The method of claim 1, wherein (e) comprises:
(e1) issuing at least one of the first alert to the user of the climate control system in response to at least one of the plurality of airflow error values being equal to or greater than a predetermined percentage decrease from the requested airflow value collected during the steady state condition, and the second alert to the user in response to each of the plurality of airflow error values being less than a predetermined percentage decrease from the requested airflow value collected during the steady state condition.

8. The method of claim 1, further comprising:
(f) querying the user of the climate control system to select an operational mode of the climate control system for which a commissioning of the climate control system will be performed;
wherein (a) comprises:
(a1) transitioning the climate control system from an idle mode to the selected operational mode to operate the indoor fan of the climate control system by transmitting the requested airflow value to the fan controller of the indoor fan, wherein the requested airflow value is based on the selected operational mode.

9. The method of claim 8, wherein:
the user comprises an installer of the climate control system; and
issuing the second alert comprises issuing a positive verification to the installer.

10. The method of claim 8, further comprising:
(g) querying the user of the climate control system to select one of a cooling mode, a heating mode, and a fan-only mode of the climate control system.

11. The method of claim 8, further comprising:
(g) returning the climate control system to the idle mode once a predetermined commissioning time period has elapsed following the transition of the climate control system from the idle mode to the selected operational mode, wherein the commissioning time period is based on the selected operational mode.

12. The method of claim 11, wherein the commissioning time period comprises a heating commissioning time period for the heating mode, a cooling commissioning time period for the cooling mode, and a fan-only commissioning time period for the fan-only mode, and wherein the heating commissioning time period and the cooling commissioning time period is each greater than the fan-only commissioning time period.

13. A climate control system for an indoor space, the climate control system comprising:
an indoor fan configured to produce an airflow through the indoor space;
a controller to be coupled to the indoor fan, wherein the controller is configured to:
operate the indoor fan of the climate control system to produce the airflow through the indoor space by transmitting a requested airflow value to a fan controller of the indoor fan;
collect a plurality of estimated airflow values of the indoor fan estimated by the controller;
identify a steady state condition of the climate control system from the plurality of estimated airflow values;
determine a plurality of airflow error values from the requested airflow value and the plurality of estimated airflow values collected during the steady state condition; and
issue at least one of a first alert to a user of the climate control system in response to at least one of the plurality of airflow error values being equal to or greater than an alert value, and a second alert to the user in response to each of the plurality of airflow error values being less than the alert value.

14. The climate control system of claim 13, wherein the controller is configured to:
remove any of the plurality of airflow error values collected during the steady state condition that are repeated and apply a median filter to any of the plurality of airflow error values which exceed a predetermined maximum airflow error value to determine a plurality of filtered airflow error values; and
determine a plurality of smoothed airflow error values by replacing a second filtered airflow error value of a neighboring pair of filtered airflow error values with a sum comprising a first filtered airflow error value of the neighboring pair of filtered airflow errors and a difference between the first and second filtered airflow error values multiplied by a gain in response to the difference between the first and second filtered airflow error values being equal to or greater than a predetermined maximum error difference;
wherein the first alert to the user of the climate control system is issued in response to at least one of the plurality of smoothed airflow error values being equal to or greater than the alert value and the second alert to the user is issued in response to each of the plurality of smoothed airflow error values being less than the alert value.

15. The climate control system of claim 14, wherein the controller is configured to collect a plurality of estimated external static pressure (ESP) values of the indoor fan estimated by the controller, identify any of the plurality of estimated ESP values which are repeated, and remove the airflow error values corresponding to the repeated estimated ESP values to determine the plurality of filtered airflow error values.

16. The climate control system of claim 13, wherein the controller is configured to:
- define a moving window of the plurality of estimated airflow values having a fixed size;
- determine a range of the estimated airflow values within the moving window;
- replace the estimated airflow value collected at the earliest point in time among the estimated airflow values within the moving window with the estimated airflow value collected immediately following the estimated airflow value collected at the latest point in time among the estimated airflow values within the moving window in response to the range being equal to or greater than a predetermined threshold range; and
- identify the steady state condition in response to the range being less than the predetermined threshold range.

17. The climate control system of claim 13, wherein the controller is configured to issue at least one of the first alert to the user of the climate control system in response to at least one of the airflow error values being equal to or greater than a predetermined percentage decrease from the requested airflow value collected during the steady state condition, and the second alert to the user in response to each of the airflow error values being less than the predetermined percentage decrease from the requested airflow value collected during the steady state condition.

18. The climate control system of claim 13, wherein the controller is configured to:
- query the user of the climate control system to select an operational mode of the climate control system for which a commissioning of the climate control system will be performed when the climate control system is in an idle mode; and
- transition the climate control system from an idle mode to the selected operational mode to operate the indoor fan of the climate control system by transmitting the requested airflow value to the fan controller of the indoor fan, wherein the requested airflow value is based on the selected operational mode.

19. The climate control system of claim 18, wherein the controller is configured to return the climate control system to the idle mode once a predetermined commissioning time period has elapsed following the transition of the climate control system from the idle mode to the selected operational mode, wherein the commissioning time period is based on the selected operational mode.

20. The method of claim 19, wherein the commissioning time period comprises a heating commissioning time period for the heating mode, a cooling commissioning time period for the cooling mode, and a fan-only commissioning time period for the fan-only mode, and wherein the heating commissioning time period and the cooling commissioning time period is each greater than the fan-only commissioning time period.

* * * * *